US011899706B2

(12) United States Patent
Lewis et al.

(10) Patent No.: US 11,899,706 B2
(45) Date of Patent: Feb. 13, 2024

(54) CONTENT-SPECIFIC KEYWORD NOTIFICATION SYSTEM

(71) Applicant: GOOGLE LLC, Mountain View, CA (US)

(72) Inventors: Justin D. Lewis, Marina Del Rey, CA (US); Scott Tadashi Davies, Santa Monica, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/390,308

(22) Filed: Jul. 30, 2021

(65) Prior Publication Data

US 2021/0357444 A1    Nov. 18, 2021

Related U.S. Application Data

(63) Continuation of application No. 15/293,377, filed on Oct. 14, 2016, now abandoned.

(51) Int. Cl.
*G06F 16/435*     (2019.01)
*G06F 16/48*     (2019.01)
(Continued)

(52) U.S. Cl.
CPC ........ *G06F 16/435* (2019.01); *G06F 16/2477* (2019.01); *G06F 16/3349* (2019.01);
(Continued)

(58) Field of Classification Search
CPC .................................................. G06F 16/435
See application file for complete search history.

(56) References Cited

U.S. PATENT DOCUMENTS 5,157,783 A    10/1992   Anderson et al.
7,613,769 B1   11/2009   Hess
(Continued)

FOREIGN PATENT DOCUMENTS

CN    103365917    10/2013
CN    104364814    2/2015
(Continued)

OTHER PUBLICATIONS

China National Intellectual Property Administration; Notice of Allowance issued in Application No. 201710938275.3; 4 pages; dated Nov 24, 2021.
(Continued)

*Primary Examiner* — Brittany N Allen
(74) *Attorney, Agent, or Firm* — Gray Ice Higdon

(57) ABSTRACT

Systems, apparatuses, and methods for providing content using notifications with content-specific keywords are provided. In one example embodiment, a method includes identifying, by one or more computing devices, a media content item for a user of a user device. The method includes generating, by the one or more computing devices, a keyword for the user of the user device based at least in part on data associated with the media content item. The keyword is indicative of the media content item. The method includes providing, by the one or more computing devices to the user device, for display a notification indicating that the media content is available for the user. The notification includes the keyword and the keyword is viewable by the user.

20 Claims, 7 Drawing Sheets

(51) Int. Cl.
  *G06F 16/438* (2019.01)
  *G06F 16/2458* (2019.01)
  *G06F 16/33* (2019.01)
  *G06F 16/738* (2019.01)
(52) U.S. Cl.
  CPC .......... *G06F 16/438* (2019.01); *G06F 16/489* (2019.01); *G06F 16/738* (2019.01)

(56) References Cited

U.S. PATENT DOCUMENTS

| | | |
|---|---|---|
| 7,958,193 B2 | 6/2011 | Augustine et al. |
| 8,423,541 B1 | 4/2013 | Baluja et al. |
| 9,094,730 B1 | 7/2015 | Kirmse et al. |
| 9,197,736 B2 * | 11/2015 | Davis .................. G06F 3/04847 |
| 9,253,551 B1 | 2/2016 | Lewis et al. |
| 9,286,263 B1 | 3/2016 | Collins et al. |
| 9,325,653 B1 | 4/2016 | Peterson et al. |
| 9,326,030 B2 | 4/2016 | Lewis et al. |
| 9,514,443 B2 | 12/2016 | DeLuca et al. |
| 9,668,024 B2 | 5/2017 | Os et al. |
| 9,817,637 B2 | 11/2017 | Hersh et al. |
| 10,332,046 B2 | 6/2019 | Yelisetty et al. |
| 10,621,622 B1 * | 4/2020 | Kondal .............. G06Q 30/0269 |
| 2002/0092022 A1 | 7/2002 | Dudkicwicz et al. |
| 2005/0114452 A1 | 5/2005 | Prakash |
| 2005/0171863 A1 | 8/2005 | Hagen |
| 2006/0004580 A1 * | 1/2006 | Claudatos .......... G08B 13/1672 704/275 |
| 2007/0162432 A1 | 7/2007 | Armstrong et al. |
| 2007/0299825 A1 | 12/2007 | Rush et al. |
| 2008/0040673 A1 | 2/2008 | Zuckerberg et al. |
| 2008/0195664 A1 * | 8/2008 | Maharajh ........... G06Q 30/0244 |
| 2009/0177704 A1 * | 7/2009 | Consul ................. G06Q 10/107 |
| 2010/0005106 A1 | 1/2010 | Carter et al. |
| 2011/0065376 A1 * | 3/2011 | Forutanpour ......... H04L 67/306 709/219 |
| 2011/0173569 A1 | 7/2011 | Howes et al. |
| 2012/0030292 A1 * | 2/2012 | John ..................... G06Q 30/00 709/224 |
| 2012/0089446 A1 | 4/2012 | Gupta et al. |
| 2012/0102402 A1 | 4/2012 | Kwong |
| 2012/0221601 A1 * | 8/2012 | Omura ................ G06F 16/3322 707/E17.014 |
| 2012/0290383 A1 | 11/2012 | Busch |
| 2013/0024788 A1 | 1/2013 | Olsen et al. |
| 2013/0035995 A1 | 2/2013 | Patterson et al. |
| 2013/0198652 A1 | 8/2013 | Dunn et al. |
| 2013/0198780 A1 | 8/2013 | Kim |
| 2013/0326562 A1 | 12/2013 | Bi et al. |
| 2014/0366052 A1 * | 12/2014 | Ives ............... H04N 21/234336 725/19 |
| 2015/0066913 A1 | 3/2015 | Funk et al. |
| 2015/0188871 A1 | 7/2015 | Lewis et al. |
| 2015/0234887 A1 | 8/2015 | Greene et al. |
| 2015/0324362 A1 | 11/2015 | Glass et al. |
| 2016/0034459 A1 | 2/2016 | Larsen |
| 2016/0277351 A1 | 9/2016 | Wang et al. |
| 2017/0300531 A1 * | 10/2017 | Poovananathan ..... G06F 16/248 |
| 2018/0046719 A1 | 2/2018 | Gupta et al. |
| 2018/0107663 A1 | 4/2018 | Lewis et al. |

FOREIGN PATENT DOCUMENTS

| | | |
|---|---|---|
| CN | 105512282 | 4/2016 |
| GB | 2482417 | 2/2012 |

OTHER PUBLICATIONS

European Patent Office; Summons to Attend Oral Proceedings issued in Application No. 17780260.0; 11 pages; dated Nov. 8, 2022.

European Patent Office; Communication Pursuant to Article 94(3) issued in Application No. 17780260.0; 11 pages; dated Apr. 1, 2021.

China National Intellectual Property Administration; Notification of First Office Action issued in Application No. 201710938275.3; 16 pages; dated Apr. 6, 2021.

Weber, et al.; Notification dashboard: enabling reflection on mobile notifications. In Proceedings of the 18th International Conference on Human-Computer Interaction with Mobile Devices and Services Adjunct (MobileHCI); pp. 936-941; dated 2016.

International Search Report for PCT/US2017/052030; 10 pages; dated Nov. 9, 2017.

Written Opinion for PCT/US2017/052030; 7 pages; dated Sep. 7, 2018.

Oh et al.; SQLite Optimization with phase change memory for mobile application; Proceedings of the VLDB Endowment; vol. 8-No. 12, New York; pp. 14540-1465; dated Aug. 1, 2015.

\* cited by examiner

CONTENT-SPECIFIC KEYWORD NOTIFICATION SYSTEM

FIELD

The present disclosure relates generally to providing users with access to media content items, and more particularly, to systems and methods for providing access to media content items using notifications with content-specific keywords.

BACKGROUND

Many software applications, such as those of a mobile phone, provide a user with notices that certain content is available for a user and often prompt the user to interact with the content. These notices are displayed on a device associated with the user. For example, a sports news application may provide a notice to the user's mobile phone that a video highlighting a sporting event is available for viewing. Commonly, the user wishes to interact with the content at a later time after seeing the notice. However, if the user dismisses the notice, it can be difficult to recover the notice and find the recommended content. Users are often left searching (e.g., via an internet search engine) for the content using what they remember from the notice; sometimes, they are not able to recover the content at all. Such searching can lead to more network traffic, more server CPU cycles, and increase battery usage on the user device. The inability to find content can lead to a disappointing user experience.

Common approaches to this issue can include leaving the notice on the user's device until the user wishes to interact with the content or keeping a website of past notices for the user. However, continuous display of notices (until the user' desired interaction) can cause notices to build up, providing a poor user experience. Moreover, website lists of past notices can require the user to view a user interface and personally filter through past notices, consuming the user's time and further wasting computing resources.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for providing content using notifications with content-specific keywords. The method includes identifying, by one or more computing devices, a media content item for a user of a user device. The method includes generating, by the one or more computing devices, a keyword for the user of the user device based at least in part on data associated with the media content item, the keyword being indicative of the media content item. The method includes providing, by the one or more computing devices to the user device, for display a notification indicating that the media content is available for the user. The notification includes the keyword and the keyword is viewable by the user.

Another example aspect of the present disclosure is directed to a system for providing content using notifications with content-specific keywords. The system includes one or more processors and one or more memory devices. The one or more memory devices store instructions that when executed by the one or more processors cause the one or more processors to perform operations. The operations include identifying a media content item for a user of a user device. The operations include generating a keyword for the user of the user device based at least in part on data associated with the media content item and the user's interest in the media content item, the keyword being indicative of the media content item. The operations include providing, to the user device, for display a notification indicating that the media content is available for the user. The notification includes the keyword and the keyword is viewable by the user.

Yet another example aspect of the present disclosure is directed to one or more tangible, non-transitory computer-readable media storing computer-readable instructions that when executed by one or more processors cause the one or more processors to perform operations. The operations include identifying a media content item for a user of a user device. The operations include generating a keyword for the user of the user device based at least in part on data associated with the media content item, the keyword being indicative of the media content item. The operations include storing the keyword and data descriptive of a reference from which the user can access the media content item. The operations include providing for display a notification indicating that the media content is available for the user. The notification includes the keyword and the reference. The operations include receiving data descriptive of a user input. The user input is indicative of the keyword. The operations include providing the user access to the media content item based at least in part on the user input.

Other example aspects of the present disclosure are directed to systems, apparatuses, tangible, non-transitory computer-readable media, user interfaces, memory devices, and electronic devices for providing content using notifications with content-specific keywords.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
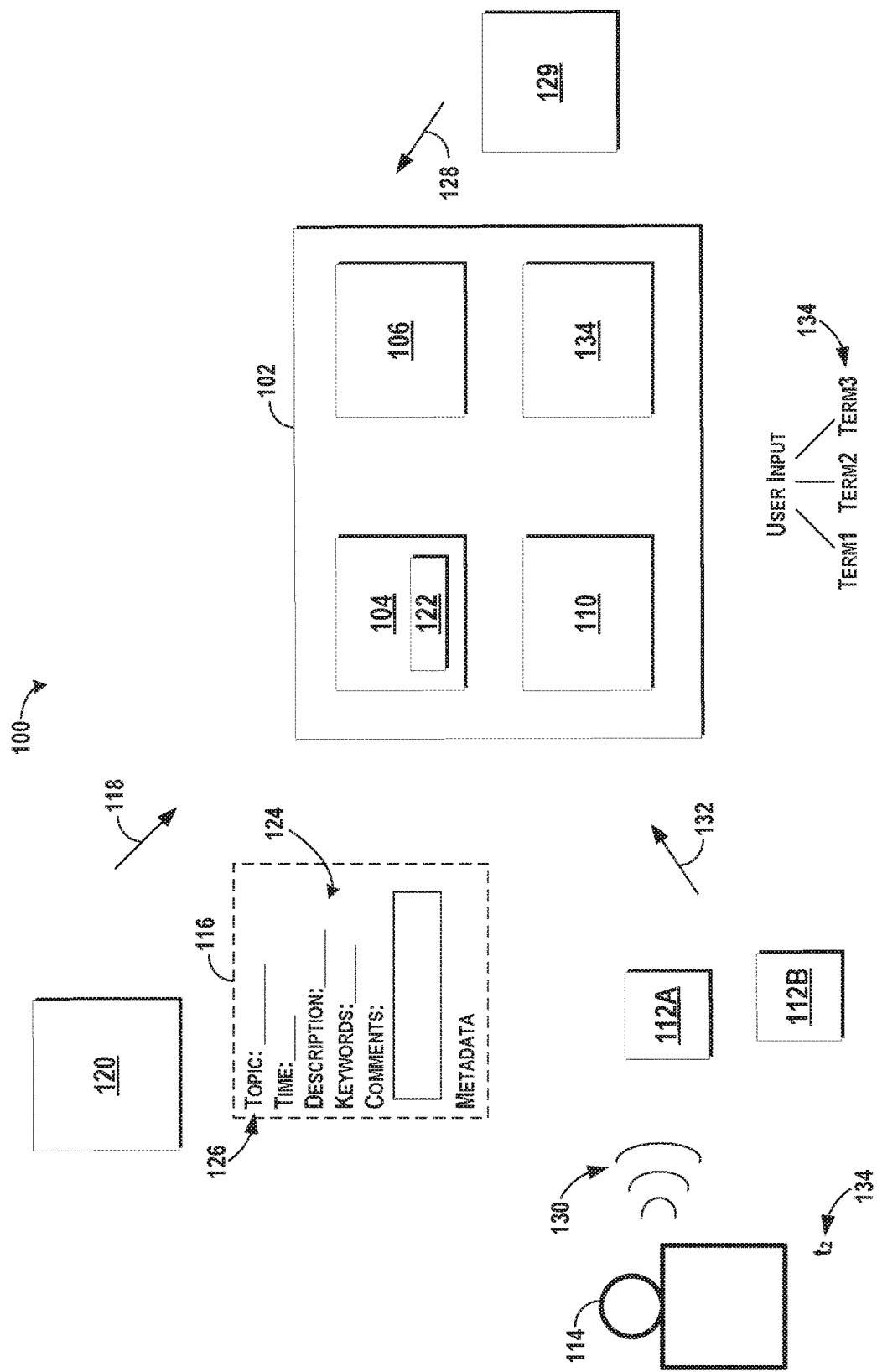
FIG. 1 depicts an example system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to providing user notifications with content-specific keywords for improved recall and retrieval of media content. For instance, a computing system according to the present disclosure can provide a user device (e.g., phone, tablet) with notifications that a media content item is available for a user to view. A notification can present information to a user informing the user that a media content item is viewable by the user and/or prompting the user to interact with (e.g., access, view, download, stream) the media content item. A media content item can include a video, image, audio content, blog post, social media post, a social media status change, check-in, combination thereof, etc. A computing system of the present disclosure can generate one or more content-specific keyword(s) and include the keyword(s) in a notification. For instance, a new video from the user's favorite video game (e.g., Planet Fight) may be uploaded to a social media site (e.g., Site A). The computing system can generate a content-specific keyword (e.g., "Planet Fight") and insert it into a text-string (e.g., "Site A uploaded a new Plant Fight video") of the notification such that the keyword is viewable by the user of the user device. Moreover, the computing system can store the keyword with, at least, a reference from which the user can access the media content item (e.g., a URL for accessing the video). The user may view the notification (including the keyword) but decide not to view the media content item at that time because the user is pre-occupied. Instead, at a later time, the user can provide (e.g., via the user device) a user input indicative of the media content item (and/or the keyword) to the computing system. For example, the user input can be a voice input such as "recent Planet Fight video". As will be further described, the computing system can process the terms of the user input to locate the content-specific keyword and the reference from which the user can access the media content item. The computing system can provide the user access to the media content item (e.g., via the user device) by using the reference (e.g., URL to the video on Site A), without the user having to review a record of past notifications. In this way, the systems and methods of the present disclosure can more efficiently provide media content items associated with user notifications, while simplifying the user's experience with respect to retrieving media content items identified in such notifications.

More particularly, an example computing system can include various components for implementing the systems and methods of the present disclosure. For instance, the computing system can include a notification component, a keyword generation component, a keyword attribution component, and a search component. These components can be implemented as one or more computing device(s) and can communicate with one another to provide notifications with content-specific keywords, as well as to provide access to media content items.

The computing system can identify a media content item for a user of a user device. For instance, the computing system (e.g., the notification component) can receive data descriptive of a notification that a media content item (e.g., video, image, social media post) is available for a user. The data descriptive of the notification can be provided, for example, from a software application (e.g., a social media app) running on a user device and/or another computing device (e.g., server system associated with the social media provider). The notification component can identify the media content item associated with the data descriptive of the notification, and in some implementations, apply de-spamming logic to filter out unwanted notifications. In some implementations, the computing system can receive data descriptive of a media content item and/or an indication that a media content item is available, without receiving data descriptive of a notification, as further described herein.

The computing system can generate a keyword indicative of the media content item based, at least in part, on data associated with the media content item. Such data can include the title, description, search keywords, comments, metadata, etc. The computing system (e.g., the keyword generation component) can process the data associated with the media content item to create the content-specific keyword. In some implementations, the computing system can determine a topic associated with the media content item (e.g., video of a Planet Fight championship game) based, at least in part, on the data associated with the media content item. In some implementations, the computing system can determine a user's interest associated with the media content item, as further described herein. The computing system can generate the keyword (e.g., "Planet Fight") based, at least in part, on the topic associated with the media content item and/or the user's interest. For example, the computing system can apply one or more canonicalization technique(s) to the topic to generate a generic name, word, phrase, etc. associated with the topic that can be used as the keyword.

The computing system can include the keyword in the notification to be provided to the user. For instance, the notification can include a notification payload. The notification payload can include a reference (e.g., URL, navigation end point) from which the user can access the media content item, a representation of the media content item (e.g., thumbnail image), one or more text string(s), and/or other information. The computing system can, for example, include the keyword in a text string of the notification (e.g., "Site A uploaded a new Planet Fight video") such that the keyword is viewable by the user. The computing system (e.g., the keyword attribution component) can store the keyword and at least a portion of the notification (e.g., the reference) in a memory device for subsequent retrieval.

The computing system can provide the notification indicating that the media content is available, to a user device for display. The user device can receive the notification (including the keyword) and display the notification such that the keyword is viewable by the user at a first time. As indicated above, the user can view the notification and dismiss the notification, deciding that she will not view the media content item at that time. The user can determine at a second time (e.g., later than the first time) that she wishes to access the media content item. To do so, the user can provide a user input to the user device. By way of example, the user input can be a voice input stating "recent science fiction game video". The user device can receive the user input, process it, and provide data descriptive of the user input to the computing system.

The computing system can receive the data descriptive of the user input and provide the user access to the media content item. For instance, the computing system (e.g., the search component) can identify one or more term(s) associated with the user input (e.g., "recent science fiction game video") and identify the stored keyword based, at least in part, on the term(s) associated with the user input. In some implementations, the computing system can apply broad-match technology to the user input to expand it to a wider range of potential canonicalized term(s). The computing system can compare each of the potential canonicalized term(s) to the stored keyword (e.g., "Planet Fight") to determine if there is a match, as will be further described. In the event of a match, the computing system can identify the data descriptive of the reference (from which the user can access the media content item) that is stored with the keyword and provide the user access to the media content item. For example, the computing system can provide the user access to the video of a Planet Fight championship game by providing a URL to the user device to navigate to a webpage that can provide, and/or by causing a software application (e.g., social media app) to provide, the video of the Planet Fight championship game. The computing system can provide such access automatically, without the user having to review past notifications in a user interface to find the desired media content item.

Providing notifications with content-specific keywords and providing user access to media content items through use of the content-specific keywords according example aspects of the present disclosure can improve the user-notification experience. More particularly, the systems and methods described herein can generate the content-specific keywords such that the keywords are memorable and relevant to the media content item. This can increase the user's ability to recall such keywords, for use at a later time when viewing the media content item may be more desirable. Additionally, by providing user access to the media content items based, at least in part, on the keyword and the user input, the systems and methods can avoid the use of user-facing webpages that include past records of notifications. This allows the user to more easily access media content items, as well as avoid the time-intensive review of past notification records. This can also help avoid the user having to perform multiple internet searches in an attempt to find the media content item. As such the systems and methods can decrease the amount of device processing and power resources used for such searching.

The systems and methods of the present disclosure provide an improvement to user device computing technology by enabling a user device to more efficiently and conveniently present media content items for a user. The systems and methods can be leveraged by user devices to more easily retrieve media content items indicated in a notification by generating a keyword based, at least in part, on data associated with the media content item, providing for display a notification including the keyword (that is viewable by the user), storing the keyword with a portion of the notification (e.g., data descriptive of a reference), and providing the user access to the media content item based, at least in part, on a user input and the keyword indicative of the media content item. In this way, the systems and methods of the present disclosure can avoid using processing and power resources of the user device to render navigable and/or searchable user interfaces that present past notification records for user review. Furthermore, the systems and methods can allow user devices without a display device to receive and transmit user inputs for content retrieval because the systems and methods do not require a user interface when determining which media content item is relevant to the search query.

The systems and methods also improve the ability of computing technology to track notification engagement by a user. Previously, if a user dismissed a notification but later searched for the associated media content item (e.g., via an internet application) and engaged with it, such engagement would not be associated with a notification. Thus, it was unknown whether a user found a particular notification of interest. The systems and methods of the present disclosure allow for more effective tracking of user-notification engagement by providing access to a user based, at least in part, on a user input that is indicative of a keyword (included in the notification) and/or media content item. This can lead to more effective de-spamming logic and/or prioritization of certain types of notifications and/or media content item, for a user.

With reference now to the FIGS., example embodiments of the present disclosure will be discussed in further detail. FIG. 1 depicts an example system 100 for providing content using notifications with content-specific keywords according to example embodiments of the present disclosure. The system 100 can include various components for performing various operations and functions described herein. For example, as shown, the system can include one or more computing device(s) 102 that can implement a notification component 104, a keyword generation component 106, a keyword attribution component 108, and a search component 110. One or more of these component(s) can be implemented on a client side system and/or one or more of these component(s) can be implemented on a server side system. These components can communicate with one another via one or more wired or wireless communication link(s). The computing device(s) 102 can include one or more processor(s) and one or more memory device(s). The one or more memory device(s) can store instructions that when executed by the one or more processor(s) cause the one or more processor(s) to perform the operations and functions, for example, such as those described herein. The computing device(s) 102 can be configured to communicate with one or more user device(s) 112A-B of a user 114. The user device(s) 112A-B can include, for example, a smartphone, tablet, wearable computing device, other mobile computing device, a display with one or more processors, server computing device, or any other type of computing device. In some implementations, one or more of the user device(s) 112A-B may not include a display.

The computing device(s) 102 can identify a media content item 116 for a user 114 of a user device 112A-B (e.g., via the notification component 104). As indicated above, a media content item 116 can include a video, image, audio content, blog post, social media post, a social media status change, check-in, combination thereof, etc. In some implementations, the notification component 104 can include a syndicating mechanism and can be configured to receive data 118 descriptive of a notification that a media content item 116 (e.g., video of the user's favorite video game—Planet Fight) is available for the user 114. The data 118 descriptive of the notification can be provided, for example, from a software application (e.g., a social media app) running on one or more of the user device(s) 112A-B and/or another computing device 120 (e.g., server system associated with a social media provider). In such a case, the software application and/or other computing device 118 can generate the notification and provide the data 118 to the computing device(s) 102. The notification component 104 can identify the media content item 116 associated with the notification, and in some implementations, apply de-spamming logic 122 to the data 118 associated with the notification, for example, to filter out unwanted notifications. The de-spamming logic 122 can filter out notifications associated with media content items that may not be of interest to the user 114.

In some implementations, the computing device(s) 102 can identify the media content item 116 for a user 114 without receiving data descriptive of a notification. The computing device(s) 102 can receive data descriptive of a media content item 116 and/or data indicating that a media content item 116 is available. In such implementations, the computing device(s) 102 may itself generate a notification indicative of the media content item 116. For instance, the notification component 104 can include a generating mechanism that is configured to generate a notification for a media content item 116. The notification component 104 can be configured to request a keyword indicative of the media content item 116 from the keyword generation component 106, such that the keyword can be included in the notification that is ultimately provided to the user 114.

The computing device(s) 102 can generate a keyword for the user 114 of the user device 112A-B based, at least in part, on data 124 associated with the media content item 116. The data 124 associated with the media content item 116 can be indicative of the title, description, search keywords, comments (from site posting the content or different site), metadata, actual content, etc. associated with the media content item 116. The keyword generation component 106 of the computing device(s) 102 can be configured to receive a request (e.g., from the notification component 104) to generate a keyword and process the data 124 associated with the media content item 116 to create the content-specific keyword. For instance, the keyword generation component 106 can be configured to determine a topic 126 associated with the media content item 116 based, at least in part, on the data 124 associated with the media content item 116. The keyword generation component 106 can implement data-crawl techniques and/or machine learning techniques to process the data 124 (e.g., title, description, content, metadata) associated with the media content item 116 (e.g., video) to determine the topic 126 (e.g., a Planet Fight championship game).

The computing device(s) 102 can generate a keyword based, at least in part, on the application of one or more canonicalization and/or broad-match techniques to the topic 126 associated with the media content item 116. Moreover, the keyword can be generated based, at least in part, on the user's language settings (e.g., identifying the user's preferred language). For example, the keyword generation component 106 can convert the topic 126 into a topic string and can apply one or more canonicalization technique(s) to the topic/topic string to generate a generic name, word, phrase, etc. associated with the topic 126 that can be used as the keyword. In some implementations, the keyword generation component 106 can broad-match the topic 126 to a plurality of different potential keywords that could represent the media content item 116, and then select the keyword that best represents the media content item 116 (e.g., based, at least in part, on the data 124) and/or that represents the least number of other media content items (e.g., for which keywords/notifications are currently stored). For example, a Planet Fight world championship game video can result in the keyword "Planet Fight" instead of "video game" because the keyword "Planet Fight" more accurately, precisely, closely, etc. describes this particular media content item 116 than the keyword "video game," which may also represent several other media content items. Accordingly, the keyword can be indicative of the media content item 116 in that it describes, relates to, and/or includes terms similar to that of the topic 126 and/or the actual content of the media content item 116.

In some cases, the computing device(s) 102 can generate the keyword based, at least in part, on the user's interest in the media content item 116. The computing device(s) 102 can access and/or obtain (e.g., from a cloud based system, local memory device) data 128 descriptive of the user's interests, the user's engagement with past notifications, and/or the user's past interactions with media content items. In some implementations, such data can be obtained from a remote and/or local (e.g., cloud based system, local memory).

By way of example, the data 128 can indicate that the user 114 has previously engaged with notifications (e.g., using the system 100) associated with hockey shot skills videos. Thus, computing device(s) 102 can identify media content items associated with hockey shot skills videos. Moreover, the keyword generation component 106 can generate a keyword that is more specific to the user's interest such as, for example, the keyword: "hockey shots skills." In this way, the computing device(s) 102 can generate a keyword that is personalized for the particular user 114 based, at least in part, on the user's interest in certain media content. Additionally, and/or alternatively, in some implementations, the computing device(s) 102 can be configured to disregard media content items for users that are not interested in the particular topic of content provided by such media content items.

Figure 2:
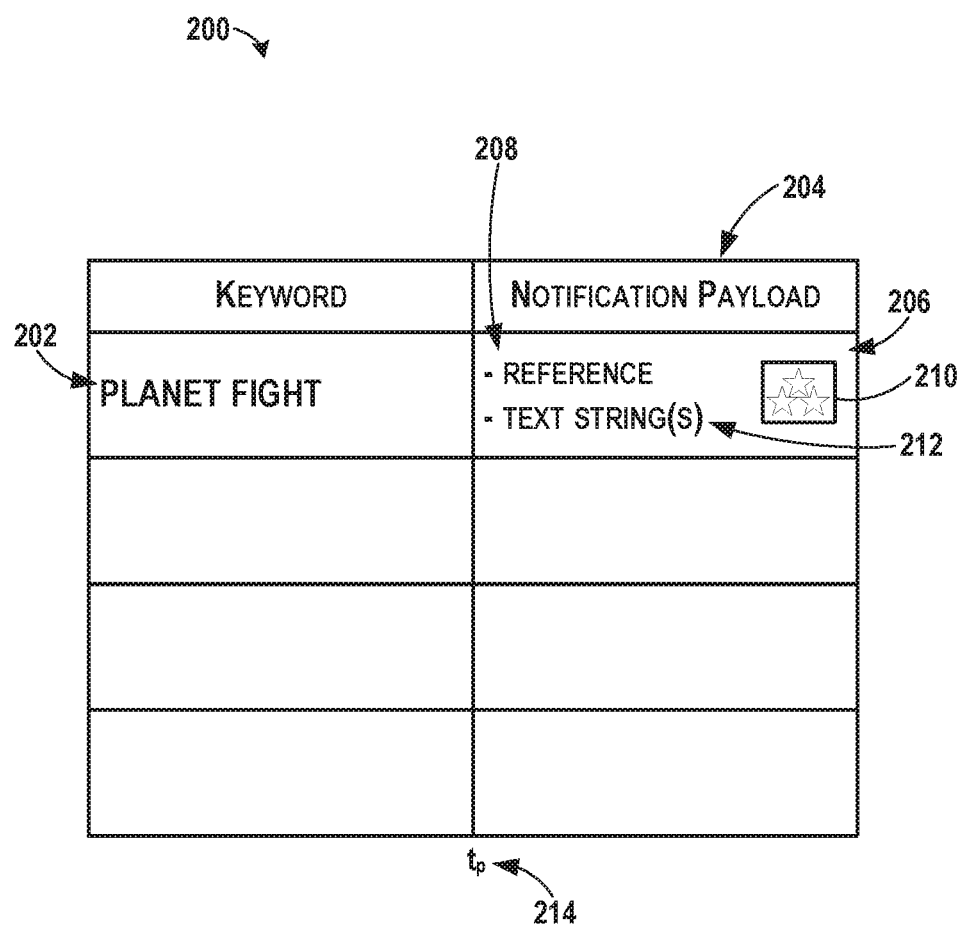
FIG. 2 depicts an example keyword registry according to example embodiments of the present disclosure.

The keyword attribution component 108 of the computing device(s) 102 can be configured to register the keyword as being attributed to a particular media content item 116 for the specific user 114. For instance, FIG. 2 depicts an example keyword registry 200 according to example embodiments of the present disclosure. The registry 200 can include one or more table(s), data field(s), and/or any other suitable data structure. The keyword attribution component 108 of the computing device(s) 102 can be configured to store the keyword 202 (e.g., "Plant Fight"). In some implementations, the keyword 202 can be stored in a canonical form (e.g., instead of its exact form) which can increase the efficiency of searching for a keyword, as discussed herein. In some implementations, the computing device(s) 102 can store a plurality of keywords attributed to a particular media content item 116. For example, the keyword attribution component 108 can be configured to apply one or more broad-match technologies to the keyword 202 to generate a plurality of keywords, for example, based at least in part on the data 124 associated with the media content item 116 and/or the topic 126.

The keyword attribution component 108 can also be configured to store at least a portion 204 of a notification that will be/has been provided to one or more of the user device(s) 112A-B. The keyword 202 can be associated with the portion 204 of the notification such that the keyword 202 is attributed to the associated media content item 116 (indicated by and/or associated with the notification). In some implementations, the notification can include a notification payload 206 and the stored portion 204 of the notification can be the notification payload 206. The notification payload 206 can include, for example, data 208 descriptive of a reference (e.g., URL, navigation end point, access link, hyperlink) from which the user 114 can access the media content item 116, a representation 210 of the media content item (e.g., thumbnail image), one or more text string(s) 212, and/or other information.

In some implementations, the computing device(s) 102 can be configured to register a plurality of media content items for the same keyword. For example, the keyword attribution component 108 can store a stack indicative of the plurality of media content items with the keyword (e.g., 202) such that the keyword is associated with the plurality of media content items. In the event that the user 114 provides user input that is indicative of the keyword, as further described herein, the media content items (of the stack) can be returned in order of the media content item that is most recently attributed to the keyword.

The computing device(s) 102 can be configured to decorate a notification to be provided to the user 114 with the keyword 202. For instance, in the event that the notification component 104 receives data 118 descriptive of a notification from another computing device 120, the notification component 104 can be configured to include the keyword 202 associated with the media content item 116 in that notification. In the event that the notification component 104 generates the notification itself, it can include the keyword 202 and/or other information in the generated notification. For example, the notification can include the notification payload 204 and/or the data 208 descriptive of the reference (e.g., URL) from which the user 114 can access the media content item 116.

Figure 3:
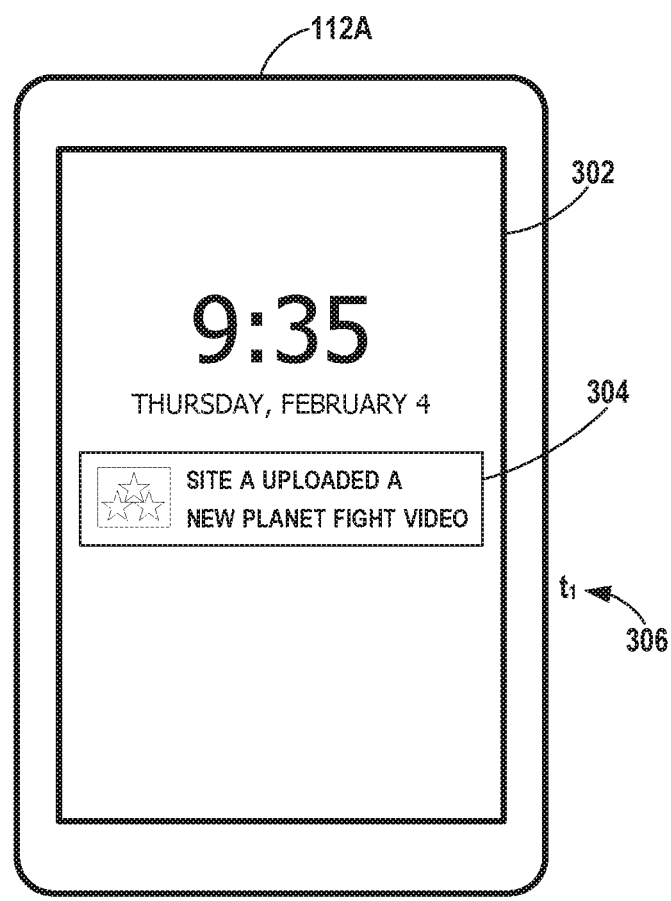
FIG. 3 depicts an example user device displaying an example notification according to example embodiments of the present disclosure.

As shown in FIG. 3, the computing device(s) 102 can be configured to provide for display (e.g., on a display device 302 of the user device(s) 112A), a notification 304 indicating that the media content 116 is available for the user 114. The notification 304 can include the keyword 202 (e.g., "Planet Fight") and the keyword 202 can be viewable by the user 114 (e.g., via the display device 302). For example, the notification 304 can include one or more text string(s) 212 that include the keyword 202 such that the user 114 can view the keyword 202. The user device 112A can receive the notification 304 (including the keyword 202) and display the notification 304 such that the keyword 202 is viewable by the user 114 at a first time 306 (e.g., t₁). As indicated above, the user 114 can view the notification 304 and dismiss the notification 304, deciding that she will not access the media content item 116 at that time.

Returning to FIG. 1, the user 114 can determine at a second time 130 (e.g., t₂), later than the first time, that she wishes to access the media content item 116. To do so, the user 114 can provide a user input 130 to one or more of the user device(s) 112A-B at the second time 134. The user input 130 can be indicative of the keyword 202 (and/or the media content item 116). By way of example, the user input 130 can be a voice input stating "recent Planet Fight video," "recent science fiction game video," "Planet Fight championship," etc. One or more of the user device(s) 112A-B can receive the user input 130, process the user input 130 (e.g., by applying one or more audio to text conversion techniques), and provide data 132 descriptive of the user input 130 to the computing device(s) 102. The computing device(s) 102 can be configured to receive the data 132 descriptive of the user input 130.

The computing device(s) 102 can be configured to provide the user 114 access to the media content item 114 based, at least in part, on the user input 130 (e.g., indicative of the keyword 202, media content item 116). For instance, the search component 110 of the computing device(s) 102 can be configured to identify one or more term(s) 134 associated with the user input 130 and identify the stored keyword 202 based, at least in part, on the one or more term(s) 134. By way of example, the search component 110 can apply one or more broad-match technologies to the data 132 indicative of the user input 130 to expand it to a wider range of potential canonicalized terms. The computing device(s) 102 can look up each of these candidate canonicalized terms, via the keyword attribution component 108, in the registry 200. If any matches are found, they can be sorted by a score (e.g., broad-match score) that is indicative of the level of similarity between the stored keyword (and/or stored terms associated with the keyword) and the term(s) 134 associated with the user input 130. The search component 110 can identify and select which stored keyword (e.g., 202) has the highest score. Moreover, the search component 110 can identify the data 208 descriptive of a reference from which the user 114 can access the media content item 116 based, at least in part, on the identified stored keyword 202. Accordingly, the computing device(s) 102 can provide the user 114 access to the media content item 116 based, at least in part, on the data 208 descriptive of the reference. For instance, the computing device(s) 102 can send the data 208 descriptive of the reference (e.g., URL, access point) such that the media content item 116 is accessible on the user device(s) 112A-B, via a web-browser application and/or another software application running on the user device. The user device(s) 112A-B and/or the user 114 can navigate to the media content item 116 using the reference.

In some implementations, the computing devices 102 can provide multiple relevant personalized results. For example, the user 114 can provide (intentionally or unintentionally) a user input 130 that is indicative of a plurality of keywords and/or media content items. The computing device(s) 102 can search for a plurality of keywords and provide a user device with access to multiple media content items and/or a list of the media content items for selection by the user 114.

The computing device(s) 102 can be configured to remove the generated keywords and/or associated data (e.g., attributed notification payload) from storage after a certain time period. For example, the computing device(s) 102 can be configured to store the keyword 202 and/or the portion 204 of the notification for a time period 214 (e.g., $t_p$ of FIG. 2). The computing device(s) 102 can be configured to remove the keyword 202 and/or the portion 204 of the notification from storage (e.g., in the registry 200) after the time period, such as 1 week, 2 weeks, month, etc. This time period can be set by a user and/or the system. In this way, the present system can reduce the use of memory resources for storing unwanted keywords and/or notifications. Also, such removal can allow the system to re-use previously generated keywords in association with other media content items for which the keywords may be appropriate.

In some implementations, the computing device(s) 102 can be configured to track a user's engagement with notifications that had been provided to the user 114 and stored for later retrieval. For example, the computing device(s) 102 can track the user input provided by a user and which of the stored keywords, notifications, and/or associated media content items the user accesses via using the system described herein. The computing device(s) 102 can generate, process, and/or store data associated with the user's engagements and/or the user's interests in certain media content items based on the tracked data. In some implementations, the computing device(s) 102 can be configured to train the de-spamming logic 122 (e.g., via machine learning techniques) to reflect the user's interests and/or engagements in such media content items. Such tracking of user-notification engagement and/or user's interests can help improve the ability of the de-spamming logic to accurately filter content for a particular user.

Figure 4:
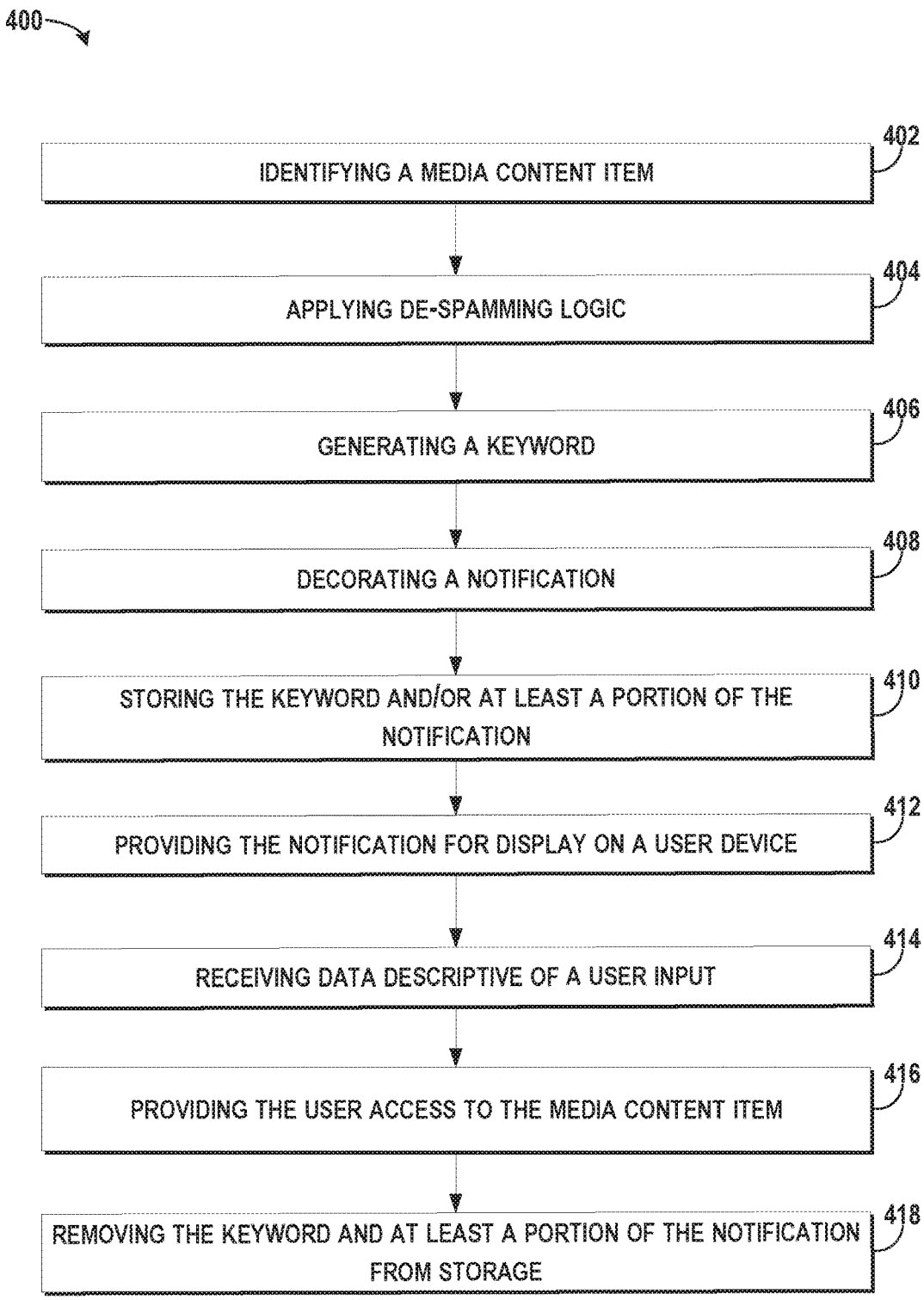
FIG. 4 depicts a flow diagram of an example method of providing content using notifications with content-specific keywords according to example embodiments of the present disclosure.

FIG. 4 depicts a flow diagram of an example method 400 of providing content using notifications with content-specific keywords according to example embodiments of the present disclosure. One or more portion(s) of method 400 can be implemented by one or more computing device(s) such as, for example, those shown in FIGS. 1 and 7. FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (402), the method 400 can include identifying a media content item. For instance, the computing device(s) 102 can identify a media content item 116 for a user 114 of a user device 112A-B. The media content item 116 can include, for example, a podcast discussing a championship match in the user's favorite video game, Planet Fight. In some implementations, the computing device(s) 102 can receive an indication (e.g., communication, message, other data) that a media content item 116 is accessible. Such indication can be provided by a software application running on a user device 112A-B (e.g., a social media app) and/or from another computing device 120 (e.g., a server system associated with a social media provider). In some implementations, the computing device(s) 102 can receive data 118 descriptive of a notification (e.g., from another computing device 120, user device 112A-B) indicative of the media content item 116. Such data can be descriptive of information associated the media content item 116 (e.g., time uploaded, description, associated software application) that a provider wishes to present to a user 114.

At (404), the method 400 can include applying a de-spamming logic to data descriptive of a notification and/or a media content item. For instance, the computing device(s) 102 can apply de-spamming logic 122 to the received data 118 descriptive of the notification and/or the indication associated with the media content item 116. The de-spamming logic 122 can be based, at least in part, on the user's interests and/or preferences for media content items. In some implementations, the de-spamming logic 122 can be based, at least in part, on the user's interaction with one or more previous notification(s). For example, as indicated above, the computing device(s) 102 can track a user's engagement with notifications that had been provided to the user 114 and stored for later retrieval. The computing device(s) 102 can track which of the stored notifications and/or associated media content items are accessed using the system described herein and train its de-spamming logic (e.g., via machine learning techniques) to reflect the user's interests and/or engagements in such media content items. By way of example, the computing device(s) 102 can track a user's previous retrieval of media content items associated with the video game Planet Fight via the system 100 and train is de-spamming logic to allow notifications related to Planet Fight content to be provided to one or more of the user device(s) associated with the user.

At (406), the method 400 can include generating a keyword. For instance, the computing device(s) 102 can generate a keyword 202 for the user 114 of the user device 112A-B based, at least in part, on data 124 associated with the media content item 116. The keyword 202 can be indicative of the media content item 116. For example, the keyword 202 (e.g., "Planet Fight") can be indicative of a podcast that discusses a championship match in the video game Planet Fight.

Figure 5:
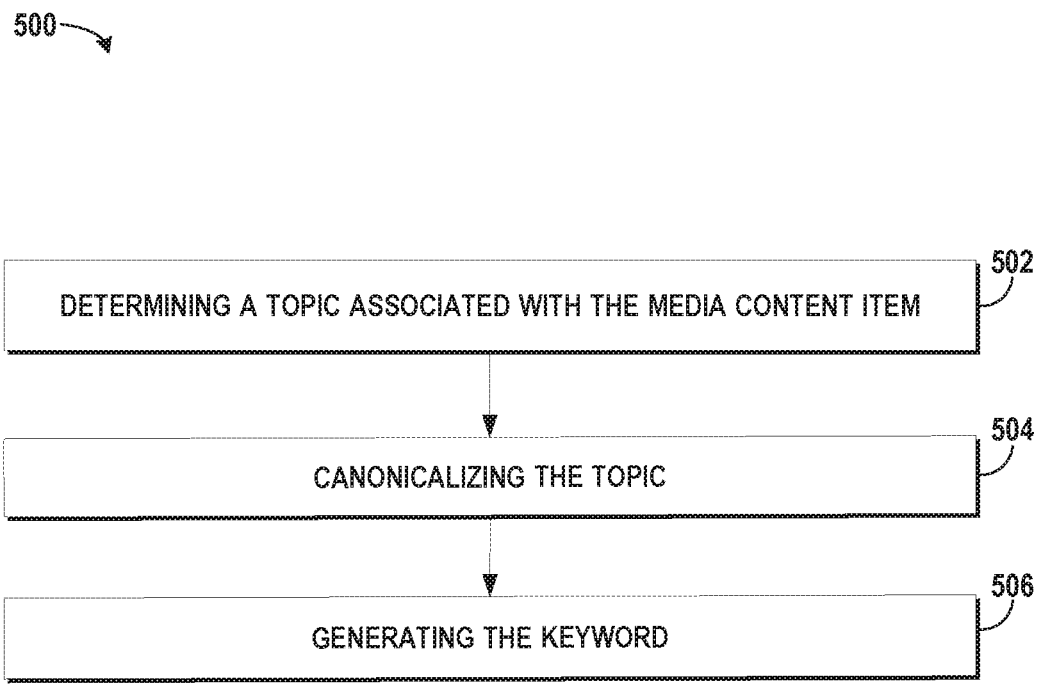
FIG. 5 depicts a flow diagram of an example method of generating keywords according to example embodiments of the present disclosure.

FIG. 5 depicts a flow diagram of an example method 500 of generating keywords according to example embodiments of the present disclosure. One or more portion(s) of method 500 can be implemented by one or more computing device(s) such as, for example, those shown in FIGS. 1 and 7. Moreover, one or more portion(s) of method 500 can be implemented with method 400, such as, for example, at (406). FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (502), the method 500 can include determining a topic associated with the media content item. For instance, the computing device(s) 102 can determine a topic 126 associated with the media content item 116 based, at least in part, on the data 124 associated with the media content item 116. The data 124 can be descriptive of the title, description, search keywords, comments (from the site posting the content or different site), metadata, actual content, etc. associated with the media content item 116. As described herein, the computing device(s) 102 can use data-crawl techniques and/or machine learning techniques to process the data 124 (e.g., title, description, content, meta-data) associated with the media content item 116 (e.g., podcast) to determine the topic 126 (e.g., a Planet Fight championship game).

The method 500 can include canonicalizing the topic, at (504), and generating the keyword, at (506). For instance, the computing device(s) 102 can apply one or more canonicalization and/or broad-match technique(s) to the topic 126 associated with the media content item 116. The computing device(s) 102 can generate the keyword 202 based, at least in part, on the topic 126 associated with the media content item 116. For example, as described herein, the computing device(s) 102 can convert the topic 126 into a topic string and can apply one or more canonicalization technique(s) to the topic/topic string to generate a generic name, word, phrase, etc. associated with the topic 126 that can be used as the keyword. In some implementations, the keyword generation component 106 can broad-match the topic 126 to a plurality of different potential keywords that could represent the media content item 116, and then select the keyword that best represents the media content item 116 (e.g., based, at least in part, on the data 124) and/or that represents the least number of other media content items 116 (e.g., for which keywords/notifications are currently stored). As described above, in some implementations, the keyword 202 can be generated based, at least in part, on the user's interest associated with the media content item 116. Moreover, the keyword 202 can be generated after application of the de-spamming logic so as not to waste computational resources (e.g., processing, storage) by generating keywords for media content items that are not to be brought to the attention of the user 114.

Returning to FIG. 4, at (408), the method 400 can include decorating a notification with the keyword. For instance, in some implementations, the computing device(s) 102 can generate the notification 304. The notification 304 can include the keyword 202 (e.g., "Planet Fight") indicative of the media content item 116 (e.g., podcast) and a notification payload 206. The notification payload 206 can include data 208 descriptive of a reference from which the user 114 can access the media content item 116. In some implementations, the computing device(s) 102 can receive data 118 descriptive of the notification 304 from another computing device 124. The received notification can be indicative of the media content item 116. In such a case, the computing device(s) 102 can include the keyword 202 associated with the media content item 116 (and generated by the computing device(s) 102), in the notification.

At (410), the method 400 can include storing the keyword and at least a portion of the notification. For instance, the computing device(s) 102 can store the keyword 202 and at least a portion 204 of the notification 304. The portion 204 of the notification 304 can include data 208 descriptive of a reference (e.g., URL) from which the user can access (e.g., view, download, stream) the media content item 116 (e.g., podcast). As described herein, the notification 304 can include a notification payload 206 and the stored portion 204 of the notification can be the notification payload 206.

At (412), the method 400 can include providing the notification for display on a user device. For instance, the computing device(s) 102 can provide, to the user device 112A for display, a notification 304 indicating that the media content 116 is available for the user 114. The notification 304 includes the keyword 202 (e.g., Planet Fight) and the keyword 202 is viewable by the user 114 (e.g., via a display device 302). As described herein, the keyword 202 can be viewable by the user 114 at a first time 306. However, the user 114 can dismiss the notification 304 at that time in the event that the user does not desire to view the media content item 116 at that time.

At (414), the method 400 can include receiving data descriptive of a user input. The computing device(s) 102 can receive data 132 descriptive of a user input 130 and the user input 130 can be indicative of the media content item 116 and/or the keyword 202. For instance, the user input 130 can include terms and/or phases that are similar to, the same as, related to the keyword 202 (e.g. "Planet Fight"). Moreover, the user input 130 can include terms and/or phases that can be broad-matched to the keyword 202 (and/or stored terms associated therewith). By way of example, the user input 130 can be a voice input stating "recent Planet Fight podcast," "Planet Fight championship discussion," etc. As described herein, the user input can be provided at a second time 134 that is different than the first time 306. In some implementations, the user input can be a textual input (e.g., via a touch screen, keypad). A user device (e.g., 112A) can receive the user input 130, such as a voice input, and apply voice processing logic to create a text string descriptive of the user input 130. The user device can send data 132 descriptive of a user input 130 to the computing device(s) 102 and the data 132 can be descriptive of the text string.

In some implementations, the user devices that receive the notification and provide data 132 descriptive of the user input 130 need not be the same. For example, the computing device(s) 102 can provide the notification 304 to be displayed via the display device 302 of a first user device 112A. As described, the user 114 can ignore/dismiss the notification at a first time 306. The user 114 can provide user input 130 indicative of the media content item 116 and/or keyword 202 to a second user device 112B (that is different from the first user device 112A), at a second time 134. The second user device 112B can provide the data 132 descriptive of the user input 130 to the computing device(s) 102. In this way, the systems and methods of the present disclosure can allow a user to retrieve media content items associated with previously provided notifications from a multitude of user devices, increasing user convenience.

At (416), the method 400 can include providing the user access to the media content item. For example, the computing device(s) 102 can provide the user 114 access to the media content item 116 based, at least in part, on the user input 130. In this way, the user 114 can view, download, stream, etc. the media content item 116 by providing a user input 130 that indicative of the keyword 202 (and/or the media content item 116).

Figure 6:
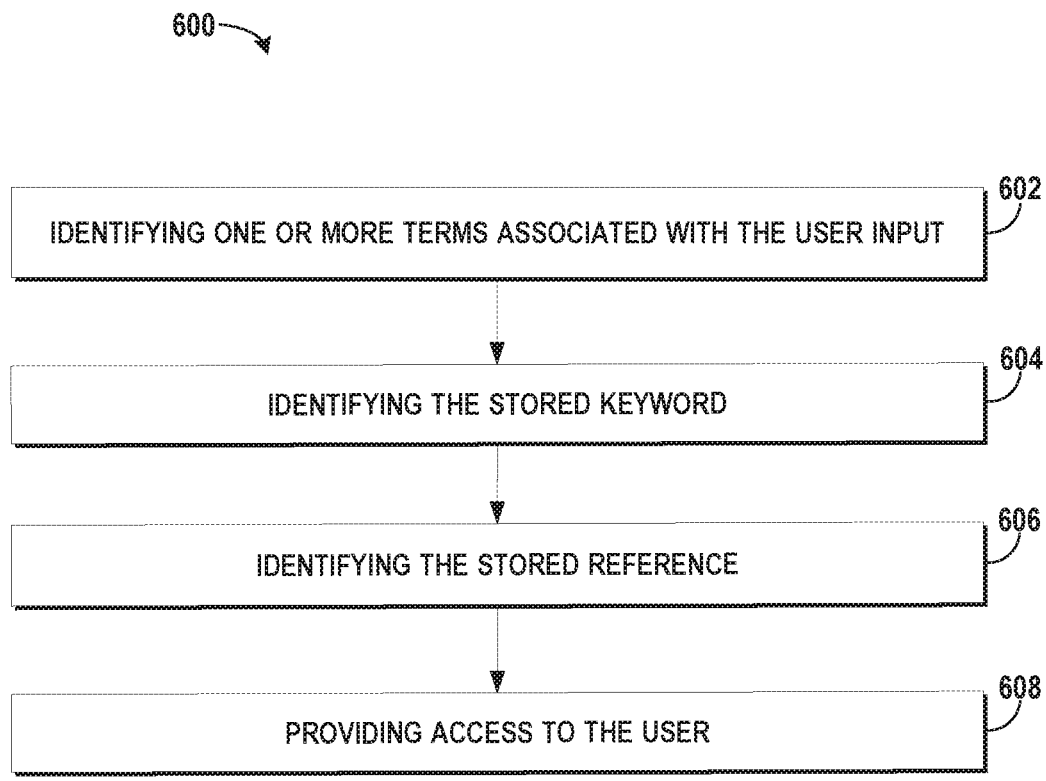
FIG. 6 illustrates a flow diagram of an example method of providing content access to a user according to example embodiments of the present disclosure.

FIG. 6 illustrates a flow diagram of an example method 600 of providing content access to a user according to example embodiments of the present disclosure. One or more portion(s) of method 600 can be implemented by one or more computing device(s) such as, for example, those shown in FIGS. 1 and 7. Moreover, one or more portion(s) of method 600 can be implemented with method 600, such as, for example, at (416). FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (602), the method 600 can include identifying one or more term(s) associated with the user input and identifying the stored keyword, at (604). For instance, the computing device(s) 102 can identify one or more term(s) associated with the user input 130 and the computing device(s) 102 can identify the stored keyword (e.g., 202) based, at least in part, on the one or more term(s) 134. To do so, the computing device(s) 102 can, for example, apply a parsing logic to the text string descriptive of the user input 130. In some implementations, the computing device(s) 102 can search for the stored keyword 202 based, at least in part, on the terms in the text string. In some implementations, the computing device(s) 102 can apply one or more broad-match technologies to the data 132 descriptive of the user input 130 to expand it to a wider range of potential canonicalized terms. The computing device(s) 102 can look up each of these candidate canonicalized terms in the registry 200. If any matches are found (e.g., with the stored keyword and/or stored terms associated therewith), the matched keywords can be sorted by a score (e.g., broad-match score) that is indicative of the level of similarity between the stored keyword (and/or stored terms associated with the keyword) and the term(s) associated with the user input 130. The search component 110 can identify and select which stored keyword (e.g., 202) has the highest score. In some implementations, the computing device(s) 102 can generate a weighted score based, at least in part, on the user's level of interest in the media content item 116 (e.g., based on past notification engagement) associated with the matched keyword. The computing device(s) 102 can select the stored keyword with the highest weighted score.

The above described approach for identification of terms and/or keywords is not intended to be limiting. One of ordinary skill in the art would understand that various techniques and/or methods can be used for the computing device(s) 102 to determine whether the user input matches any of the stored keywords (and/or associated terms).

At (606), the method 600 can include identifying the stored reference. For instance, the computing device(s) 102 can identify data 208 descriptive of a reference from which the user 114 can access the media content item 116 based, at least in part, on the identified stored keyword 202. As shown in FIG. 2, the data 208 descriptive of the reference can be stored in a manner such that it is associated with the keyword 202 and can be retrieved upon identification of the keyword 202. The reference can include a URL, navigation end point, access link, hyperlink, and/or another reference from which the user 114 can access the media content item 116. For example, the reference can be a URL to a location where the podcast discussing the Planet Fight championship game can be downloaded and/or streamed by the user 114.

Returning to FIG. 6, at (608), the method 600 can include providing access to the user. The computing device(s) 102 can provide the user 114 access to the media content item 116 based, at least in part, on the data 208 descriptive of the reference. For instance, the computing device(s) 102 can send the data 208 descriptive of the reference (e.g., URL, access point) such that the media content item 116 is accessible on the user device(s) 112A-B, via a web-browser application and/or another software application running on the user device. The user device(s) 112A-B can navigate the user 114 to the media content item 116 using the reference. This can allow the user to view, download, stream, etc. the podcast discussing the Planet Fight championship game via a user device.

In some implementations, the user device that received the notification and/or provided the data 132 descriptive of the user input 130 need not be the user device to which the computing device(s) 102 send the data 208 descriptive of the reference. For example, the computing device(s) 102 can provide the notification 304 to a first user device (e.g., 112A) and/or the first user device (e.g., 112A) can provide the data 132 descriptive of the user input 130 to the computing device(s) 102. However, the computing device(s) 102 can send the data 208 descriptive of the reference to a second user device (e.g., 112B) that is different than the first user device (e.g., 112A). In this way, the systems and methods of the present disclosure can allow a user to access content via one or more user device(s), increasing the convenience of access.

Returning to FIG. 4, at (418), the method 400 can include removing the keyword and/or the portion of the notification from storage. For instance, the computing device(s) 102 can remove the keyword 202 and the portion 204 of the notification 304 from storage after a time period 214. In some implementations, the computing device(s) 102 can remove the keyword 202 and the reference from storage after a time period 214. The time period 214 can be associated with a time frame after which the user 114 is unlikely to attempt to access a media content item (e.g., due to a lack of interest) associated with the keyword and/or reference. The time period 214 can be a single day, multiple days, 1 week, 2 weeks, 1 month, etc. This can allow the computing device(s) 102 to re-use keywords that may be appropriate for other media content items, reduce memory resources utilized for storing unnecessary keywords, reduce search times, etc.

Figure 7:
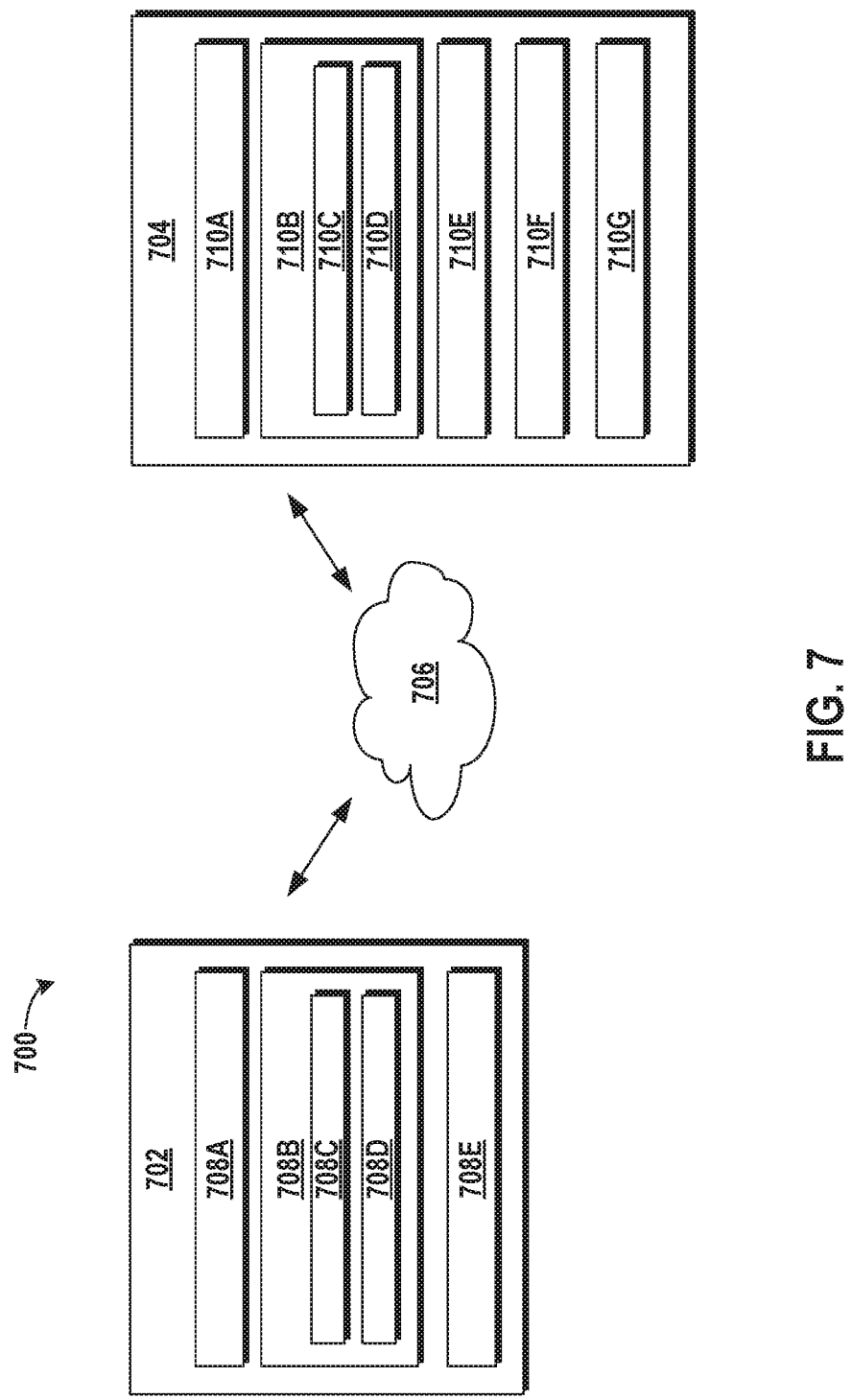
FIG. 7 depicts an example system according to example embodiments of the present disclosure.

FIG. 7 depicts an example system 700 according to example embodiments of the present disclosure. The system 700 can include one or more computing device(s) 702 and one or more user device(s) 704. The computing device(s) 702 and user device(s) 704 can correspond to the computing device(s) 102 and the user device(s) 112A-B, as described herein. The computing device(s) 702 and user device(s) 704 can be configured to communicate via one or more network(s) 706.

The computing device(s) 702 can include one or more processor(s) 708A and one or more memory device(s) 708B. The one or more processor(s) 708A can be any suitable processing device (e.g., a processor core, a microprocessor, an ASIC, a FPGA, a controller, a microcontroller, etc.) and can be one processor or a plurality of processors that are operatively connected. The memory device(s) 708B can include one or more non-transitory computer-readable storage medium(s), such as RAM, ROM, EEPROM, EPROM, flash memory devices, magnetic disks, etc., and/or combinations thereof.

The memory device(s) 708B can store information accessible by the one or more processor(s) 908A, including computer-readable instructions 708C that can be executed by the one or more processor(s) 708A. The instructions 708C can be any set of instructions that when executed by the one or more processor(s) 708A, cause the one or more processor(s) 708A to perform operations. In some embodiments, the instructions 708C can be executed by the one or more processor(s) 708A to cause the one or more processor(s) 708A to perform operations, such as any of the operations and functions for which the computing device(s) 102 are configured, the operations for providing content using notifications with content-specific keywords, generating keywords, and/or providing content access to a user (e.g., methods 500, 600, 700), and/or any other operations or functions for providing content using notifications, as described herein. By way of example, the operations can include identifying a media content item for a user of a user device, generating a keyword for the user of the user device based, at least in part, on data associated with the media content item (the keyword being indicative of the media content item), storing the keyword and data descriptive of a reference from which the user can access the media content item, providing for display a notification indicating that the media content is available for the user (the notification including the keyword and the reference), receiving data descriptive of a user input, wherein the user input is indicative of the media content item, providing the user access to the media content item based at least in part on the user input, and/or removing the keyword and the reference from storage after a time period. The instructions 708C can be software written in any suitable programming language or can be implemented in hardware. Additionally, and/or alternatively, the instructions 708C can be executed in logically and/or virtually separate threads on processor(s) 708A.

The one or more memory device(s) 708B can also store data 708D that can be retrieved, manipulated, created, or stored by the one or more processors 708A. The data 708D can include, for instance, data descriptive of stored keywords, data descriptive of portions of notifications, data descriptive of notification payloads, data descriptive of references, data descriptive of user interest's, data descriptive of user engagements with notifications and/or media content items, and/or other data or information. The data 708D can be stored in one or more databases. The one or more databases can be connected to the computing device(s) 102 by a high bandwidth LAN or WAN, or can also be connected to computing device(s) 102 through network(s) 706. The one or more databases can be split up so that they are located in multiple locales.

The computing device(s) 702 can also include a network interface 708E used to communicate with one or more other component(s) of the system 700 (e.g., user device(s) 704) over the network(s) 706. The network interface 708E can include any suitable components for interfacing with one or more network(s), including, for example, transmitters, receivers, ports, controllers, antennas, or other suitable components.

The user device(s) 704 can be any suitable type of computing device, such as a laptop, desktop, other personal computing device, navigation system, smartphone, tablet, wearable computing device, other mobile computing device, a display with one or more processor(s), server computing device, or any other type of computing device. A user device 704 can include one or more processor(s) 710A and one or more memory device(s) 710B. The one or more processor(s) 710A can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 710B can include one or more non-transitory computer-readable storage medium(s), such as RAM, ROM, EEPROM, EPROM, flash memory devices, magnetic disks, etc., and/or combinations thereof.

The memory device(s) 710B can include one or more computer-readable media and can store information accessible by the one or more processor(s) 710A, including instructions 710C that can be executed by the one or more processor(s) 710A. For instance, the memory device(s) 710B can store instructions 710C for running one or more software applications, displaying notifications, receiving user input, processing user input, accessing media content items, etc. as described herein. In some embodiments, the instructions 710C can be executed by the one or more processor(s) 710A to cause the one or more processor(s) 710A to perform operations, such as any of the operations and functions for which the user device(s) 112A-B are configured, and/or any other operations or functions of the user device(s) 112A-B, as described herein. The instructions 710C can be software written in any suitable programming language or can be implemented in hardware. Additionally, and/or alternatively, the instructions 710C can be executed in logically and/or virtually separate threads on processor(s) 710A.

The one or more memory device(s) 710B can also store data 710D that can be retrieved, manipulated, created, or stored by the one or more processor(s) 710A. The data 710D can include, for instance, data descriptive of a user input, data descriptive of a notification, etc. In some implementations, the data 710D can be received from another device.

A user device 704 can also include a network interface 710E used to communicate with one or more other component(s) of system 700 (e.g., computing device(s) 702) over the network(s) 706. The network interface 710E can include any suitable components for interfacing with one or more network(s), including for example, transmitters, receivers, ports, controllers, antennas, or other suitable components.

The user device(s) 704 can include one or more input component(s) 710F and/or one or more output component(s) 710G. The input component(s) 710F can include, for example, hardware and/or software for receiving information from a user, such as a touch screen, touch pad, data entry keys, speakers, and/or a microphone suitable for voice recognition. The output component(s) 710G can include hardware and/or software for audibly producing audio content (e.g., podcast) for a user. For example, the audio output component 710G can include one or more speaker(s), earpiece(s), headset(s), handset(s), etc. The output component(s) 710G can include a display device, which can include hardware for displaying visual media content for a user. By way of example, the output component 710G can include a display screen, CRT, LCD, plasma screen, touch screen, TV, projector, etc. in some implementations, the user device 704 may not include a display device.

The network(s) 706 can be any type of communications network, such as a local area network (e.g. intranet), wide area network (e.g. Internet), cellular network, or some combination thereof and can include any number of wired or wireless links. The network(s) 706 can also include a direct connection between one or more component(s) of system 700. In general, communication over the network(s) 706 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

Furthermore, computing tasks discussed herein as being performed at a server can instead be performed at a user device. Likewise, computing tasks discussed herein as being performed at the user device can instead be performed at the server.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for providing content using notifications with content-specific keywords, comprising:
   receiving, from a server of a software application associated with a computing device of a particular user, notification data indicating that a media content item is available for the particular user, wherein the media content item is a video;
   identifying the media content item based on the notification data;
   generating a content-specific keyword for the media content item for the particular user of the computing device;
   providing, by the computing device of the user, a notification to the particular user indicating that the media content item is currently accessible by the particular user, wherein the notification:
      is provided for presentation to the particular user prior to provision of the media content item and without provision of the media content item, and
      includes the content-specific keyword generated for the particular user;
   attributing the content-specific keyword to a portion of the notification based on storing the content-specific keyword in association with the portion of the notification for the particular user, wherein the portion of the notification is in addition to any portions of the notification that include the content-specific keyword;

subsequent to providing the notification, subsequent to the provided notification being dismissed, and subsequent to attributing the content-specific keyword to the portion of the notification for the particular user:
receiving, from the particular user, user input including one or more spoken terms;
identifying the content-specific keyword attributed to the portion of the notification for the particular user based on one or more of the spoken terms; and
based on identifying the content-specific keyword attributed to the portion of the notification for the particular user:
causing the computing device to automatically provide the media content item to the particular user.

2. The computer-implemented method of claim 1, wherein the content- specific keyword is personal to the user and is generated based at least in part on the user's interest associated with the media content item, and wherein an additional keyword, that is personal to an additional user, is generated for the media content item for the additional user, and provided in an additional notification to the additional user.

3. The computer-implemented method of claim 1, further comprising:
generating, by the computing device and based on the notification data, the portion of the notification.

4. The computer-implemented method of claim 3, further comprising:
applying de-spamming logic to the received notification data, wherein the content-specific keyword is generated after application of the de-spamming logic.

5. The computer-implemented method of claim 1, wherein generating the content-specific keyword for the media content item for the particular user is based at least in part on the particular user's engagement with past notifications.

6. The computer-implemented method of claim 1, wherein the association between the content-specific keyword and the portion of the notification is stored for a time period, and wherein the method further comprises:
removing, by the computing device, the association between the content-specific keyword and the portion of the notification from storage after the time period.

7. The computer-implemented method of claim 1, wherein causing the computing device to provide the media content item to the particular user comprises causing the computing device to provide the media content item to the particular user without requiring the user to view a record of the notification.

8. The computer-implemented method of claim 1, wherein the portion of the notification provided to the particular user further includes a thumbnail image representation of the media content item.

9. A system for providing content using notifications with content-specific keywords, the system comprising:
one or more processors; and
one or more memory devices, the one or more memory devices storing instructions that when executed by the one or more processors cause the one or more processors to perform operations, the operations comprising:
receiving, from a server of a software application associated with a computing device of a particular user, notification data indicating that a media content item is available for the particular user, wherein the media content item is a video;
identifying the media content item based on the notification data;
generating a content-specific keyword for the media content item for the particular user of the computing device;
providing, by the computing device of the user, a notification to the particular user indicating that the media content item is currently accessible by the particular user, wherein the notification:
is provided for presentation to the particular user prior to provision of the media content item and without provision of the media content item, and
includes the content-specific keyword generated for the particular user;
attributing the content-specific keyword to a portion of the notification based on storing the content-specific keyword in association with the portion of the notification for the particular user, wherein the portion of the notification is in addition to any portions of the notification that include the content-specific keyword;
subsequent to providing the notification, subsequent to the provided notification being dismissed, and subsequent to attributing the content-specific keyword to the portion of the notification for the particular user:
receiving, from the particular user, user input including one or more spoken terms;
identifying the content-specific keyword attributed to the portion of the notification for the particular user based on one or more of the spoken terms; and
based on identifying the content-specific keyword attributed to the portion of the notification for the particular user:
causing the computing device to automatically provide the media content item to the particular user.

10. The system of claim 9, wherein the content-specific keyword is personal to the user and is generated based at least in part on the user's interest associated with the media content item, and wherein an additional keyword, that is personal to an additional user, is generated for the media content item for the additional user, and provided in an additional notification to the additional user.

11. The system of claim 9, the operations further comprising:
generating, by the computing device and based on the notification data, the portion of the notification.

12. The system of claim 11, the operations further comprising:
applying de-spamming logic to the received notification data, wherein the content-specific keyword is generated after application of the de-spamming logic.

13. The system of claim 9, wherein generating the content-specific keyword for the media content item for the particular user is based at least in part on the particular user's engagement with past notifications.

14. The system of claim 9, wherein the association between the content- specific keyword and the portion of the notification is stored for a time period, and wherein the method further comprises:
removing, by the computing device, the association between the content-specific keyword and the portion of the notification from storage after the time period.

15. The system of claim 9, wherein causing the computing device to provide the media content item to the particular user comprises causing the computing device to provide the media content item to the particular user without requiring the user to view a record of the notification.

16. The system of claim 9, wherein the portion of the notification provided to the particular user further includes a thumbnail image representation of the media content item.

17. One or more tangible, non-transitory computer-readable media storing computer-readable instructions that when executed by one or more processors cause the one or more processors to perform operations, the operations comprising:
   receiving, from a server of a software application associated with a computing device of a particular user, notification data indicating that a media content item is available for the particular user, wherein the media content item is a video;
   identifying the media content item based on the notification data;
   generating a content-specific keyword for the media content item for the particular user of the computing device;
   providing a notification to a display of the computing device of the particular user for presentation to the user, the notification indicating that the media content item is currently accessible by the particular user, wherein the notification:
      is provided for presentation to the particular user prior to provision of the media content item and without provision of the media content item, and
      includes the content-specific keyword generated for the particular user;
   attributing the content-specific keyword to a portion of the notification based on storing the content-specific keyword in association with the portion of the notification for the particular user, wherein the portion of the notification is in addition to any portions of the notification that include the content-specific keyword;
   subsequent to providing the notification, subsequent to the provided notification being dismissed, and subsequent to attributing the content-specific keyword to the portion of the notification for the particular user:
      receiving, from the particular user, user input including one or more spoken terms;
      identifying the content-specific keyword attributed to the portion of the notification for the particular user based on one or more of the spoken terms; and
      based on identifying the content-specific keyword attributed to the portion of the notification for the particular user:
         causing the computing device to automatically provide the media content item to the particular user.

18. The one or more tangible, non-transitory computer-readable media of claim 17, wherein generating the content-specific keyword for the media content item for the particular user is based at least in part on the particular user's engagement with past notifications.

19. The one or more tangible, non-transitory computer-readable media of claim 17, wherein causing the computing device to provide the media content item to the particular user comprises causing the computing device to provide the media content item to the particular user without requiring the user to view a record of the notification.

20. The method of claim 1, wherein generating the content-specific keyword for the media content item for the particular user of the computing device comprises:
   identifying a plurality of candidate content-specific keywords for the media content item, including the content-specific keyword and an alternative content-specific keyword;
   determining the content-specific keyword represents a lesser quantity of media content items than does the alternative content-specific keyword; and
   generating the content-specific keyword for the media content item for the particular user of the computing device based on determining that the content-specific keyword represents the lesser quantity of media items than the alternative content-specific keyword.

* * * * *